United States Patent Office 3,497,598
Patented Feb. 24, 1970

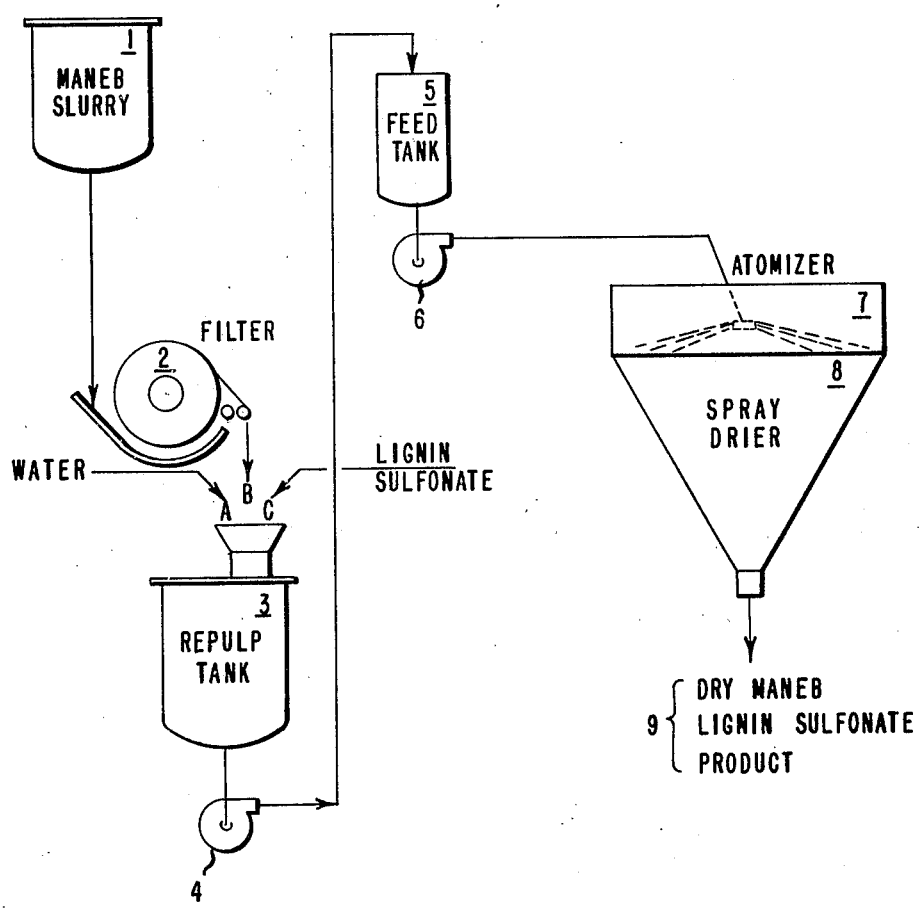

3,497,598
PROCESS FOR PRODUCING SPRAY DRIED MANGANESE ETHYLENE BISDITHIOCARBAMATE COMPOSITIONS
Christian Benjamin Luginbuhl, Shipley Heights, Del., assignor to E. I. du Pont de Nemours and Company, Wilmington, Del., a corporation of Delaware
Continuation-in-part of application Ser. No. 549,408, May 11, 1966. This application Jan. 31, 1968, Ser. No. 709,851
Int. Cl. A01n 9/00; A61k 27/00; A61l 13/00
U.S. Cl. 424—287                    1 Claim

ABSTRACT OF THE DISCLOSURE

Preparing a dry manganese ethylene bisdithiocarbamate composition by adding lignin sulfonate, zinc ions, a stabilizer, and other wetting and dispersing agents to a wet filter cake of manganese ethylene bisdithiocarbamate and thereafter spray drying the entire mixture.

CROSS REFERENCE TO RELATED APPLICATION

This application is a continuation-in-part of application Ser. No. 549,408, filed May 11, 1966, by Christian B. Luginbuhl, now abandoned.

BACKGROUND OF INVENTION

This invention relates to methods for preparing dry compositions containing manganese ethylene bisdithiocarbamate. Manganese ethylene bisdithiocarbamate, commonly called maneb, is presently recognized as the outstanding foliar fungicide for use on crops such as tomatoes. Many attempts have been made to overcome some of the problems involved with the dispersion of maneb in agricultural sprays. It has frequently been necessary to mix maneb with several different surface-active agents in order to obtain proper dispersion. Additionally, it has been necessary to add stabilizers to the maneb such as paraformaldehyde and hexamethylenetetramine.

It is customary in preparing maneb for use in agricultural sprays to react nabam, sodium ethylene bisdithiocarbamate, and manganese sulfate. The crude maneb product is then prepared for drying by filtration or decantation to remove the sodium sulfate and manganese sulfate excess and then may be admixed with additional water. The maneb slurry is then pumped to an atomizer leading into a spray drier where water is removed from the maneb. Other pneumatic or dispersion driers in which the product in finely dispersed form is dried while being carried in a moving stream of heated gas are also used; for example, the Micro-Drier, Jet-O-Drier and the like.

Various surface-active agents, zinc ions, stabilizers such as paraformaldehyde and hexamethylenetetramine and other additives are then added to the maneb product in order to formulate the commercial mixture.

Limitations in the above process include the requirement for large amounts of water to keep the maneb slurry pumpable and to avoid the tendency of the maneb to clog valves and fittings. Frequently the maneb slurry builds up on the inside of the repulp tank and feed tanks, requiring costly maintenance. Partial decomposition of the maneb is also sometimes noted during this process.

SUMMARY OF THE INVENTION

It is now discovered that by admixing a calcium, magnesium, sodium or potassium lignin sulfonate with the maneb slurry after dewatering, there results a mixture which remains readily pumpable at lower water levels. The problem of clogged valves and fittings is diminished, as is the build-up of slurry on the inside of repulp and feed tanks. Additionally, the maneb does not decompose during the process and a more completely dried product emanates from the spray drier, i.e., it is not necessary to add surfactants to the dried products and the amount of stabilizer required is less. From an economic viewpoint substantial saving accrues from an increased recovery of maneb and a decreased yield of unwanted decomposition products.

More specifically, the improved process for preparing dry compositions containing manganese ethylene bisdithiocarbamate which is the subject of this invention comprises applying 0.1 to 10 percent by weight of a calcium, magnesium, sodium or potassium lignin sulfonate to a wet filter cake of manganese ethylene bisdithiocarbamate, the percent by weight of lignin sulfonate being based on the total dry weight of manganese ethylene bisdithiocarbamate present in the filter cake.

Other conventional additives compatible with maneb can be added to the filter cake prior to drying. As mentioned, above, these include stabilizing agents such as paraformaldehyde and hexamethylenetetramine, zinc ion containing compounds, and also wetting and dispersing agents. Typical of types of wetting and dispersing agents suitable for use are methylcellulose, sold under the proprietary name, "Methocel," alkali metal salts of alkylnaphthalene sulfonic acids, particularly sodium alkylnaphthalene sulfonate, the sulfonated higher alcohols, polyvinyl alcohols, polyethylene oxides, the alkali metal or amine salts of oleic acid, the sulfonated animal and vegetable oils such as sulfonated fish and castor oils and sulfonated petroleum oils.

DESCRIPTION OF THE DRAWING

The process is best described by referring to the diagram. Number 1 refers to the maneb slurry tank which contains manganese ethylene bisdithiocarbamate, sodium sulfate, manganese sulfate, and other by-products of the reaction between nabam and manganese sulfate. The crude slurry is filtered through number 2 where the sodium sulfate and manganese sulfate are removed. At the conclusion of the filtering operation, the filter cake B is admixed with water, A, and a lignin sulfonate, C. Other conventional additives such as the various surface active agents, zinc ions, stabilizers and other formulating agents are conveniently added at this point, with the lignin sulfonate or at any point further along prior to or after the spray drying step.

B is primarily wet manganese ethylene bisdithiocarbamate. It can be best described as a wet filter cake. The lignin sulfonate is added at the rate of 0.1 to 10 percent by weight based on the dry weight of the manganese ethylene bisdithiocarbamate. The lignin sulfonate can be the calcium, magnesium, sodium or potassium salt of lignin sulfonic acid. The lignin sulfonate, manganese ethylene bisdithiocarbamate and water are mixed in the repulp tank 3 and are then pumped 4 into the feed tank 5.

It is acceptable to add the lignin sulfonate after the water and manganese ethylene bisdithiocarbamate enter the feed tank. The same amount of lignin sulfonate would be added in tank 5 based again on the dry weight of the manganese ethylene bisdithiocarbamate. It is less desirable to add the lignin sulfonate at this point in the process since one of the distinct advantages is use of less water in the process when the lignin sulfonate is introduced with the water in the repulp tank.

Lignin sulfonate can be added as goulac which is a mixture of magnesium lignin sulfonate, calcium lignin sulfonate and pentose sugars.

From the feed tank the mixture is pumped 6 to the atomizer 7. If the lignin sulfonate is not added to the process mixture before entry of the water and manganese ethylene bisdithiocarbamate into the repulp tank or in the feed tank, it could be added just prior to the entry of the process mixture into the atomizer. Of course, this is again less preferred for the same reasons mentioned above. The amount of lignin sulfonate added at this point would be the same as described above. The formulating agents and other additives also can be added at this point just prior to the entry of the process mixture to the atomizer. The atomizer 7, breaks up the particles and they are sprayed into a drier 8 which removes the water and produces the dried product consisting of manganese ethylene bisdithiocarbamate, lignin sulfonate and other additives.

It is of optimum advantage to add the lignin sulfonate or goulac to the wet filter cake, but it can be added with good results at any time prior to spray drying. An additional substantial advantage realized from addition of the lignin sulfonate prior to spray drying is that it tends to help the dried particles agglomerate, many of which are ordinarily very fine initially. This makes collection easier and improves the yield of the drying process.

As noted, the formulating agents mentioned previously can be added prior to spray drying rather than afterwards to give a completely formulated, ready to apply product directly from the spray drying operation. For example, in a typical formulation for use on various types of crops, the following formulating ingredients could be added along with the lignin sulfonate as described above prior to spray drying: up to 10% of dispersing, suspending or wetting agents such as methyl cellulose and sodium alkyl naphthalenesulfonate, up to 6% of zinc ions as zinc sulfate or zinc sulfite, and up to 2% of a stabilizer such as paraformaldehyde or hexamethylenetetramine. The percentages are by weight based on the weight of dry maneb.

The dry product then can be used as is or formulated in any additional manner and packaged for eventual use.

The following illustrative examples are provided to more fully describe the invention:

EXAMPLE 1

A maneb water slurry, prepared by the addition of a 10% solution of manganese sulfate to a 9% water solution of sodium ethylene bisdithiocarbamate is filtered to remove the excess water and water soluble salts and then repulped with water to give a solids concentration of 40.8%. This slurry is pumped to a spray drier operating with inlet air temperatures in the region of 280° C. and exit gas temperature of 110° C. The product recovery is 268 kilograms per hour of a product analyzing 89.7% maneb and 3.2% decomposition products; thus giving a capacity of 78% of theoretical for the drier.

To a similar slurry which had been prepared in analogous fashion is added 1% by weight of goulac which is as noted above a mixture of magnesium lignin sulfonate, calcium lignin sulfonate and pentose sugars, to give a maneb solids concentration of 40.6%. Goulac is added to the holding tank 5 immediately preceding the spray drier. The product is produced under similar drying conditions as described above without goulac, but is recovered at a rate of 343 kilograms per hour to give a drying capacity of 100% of theoretical. The product recovered analyzes 90.3% maneb and only 0.9% decomposition products; thus showing a very significant improvement in both yield and product quality. The remaining 8.8% consists of water and small amounts of water soluble salts.

EXAMPLE 2

A water-maneb slurry prepared according to the first paragraph of Example 1 is prepared and then the following ingredients are added to the holding tank 5 immediately preceding the spray drier. The percentages are by weight based on the amount of dry maneb. 1.0% of goulac, which is as described, a mixture of magnesium lignin sulfonate, calcium lignin sulfonate and pentose sugars, 1.0% methyl cellulose, 0.5% of sodium alkyl naphthalenesulfonate, and 1% paraformaldehyde as a stabilizer. This slurry is pumped to a spray drier operating with inlet air temperature in the region of 240° C. and exit gas temperature of 110° C. The product recovered is 88.0% maneb and has excellent suspendibility characteristics comparable to finished product to which formulating agents are normally added after the maneb has been dried.

What is claimed is:

1. A process for preparing a dry composition containing manganese ethylene bisdithiocarbamate comprising adding 0.1 to 10 percent by weight of goulac to a wet filter cake of manganese ethylene bisdithiocarbamate, the percent by weight of goulac being based on the total dry weight of manganese ethylene bisdithiocarbamate present in the filter cake, forming an aqueous slurry of said filter cake and spray drying said slurry.

References Cited

UNITED STATES PATENTS

| 2,504,404 | 4/1950 | Flenner | 167—22 |
| 2,662,841 | 12/1953 | Fike et al. | 167—22 |
| 3,085,042 | 4/1963 | Luginbuhl | 167—22 |
| 3,293,126 | 12/1966 | Person et al. | 167—42 |
| 2,858,250 | 10/1958 | Geary | 167—42 |

ALBERT T. MEYERS, Primary Examiner

J. V. COSTIGAN, Assistant Examiner